United States Patent Office.

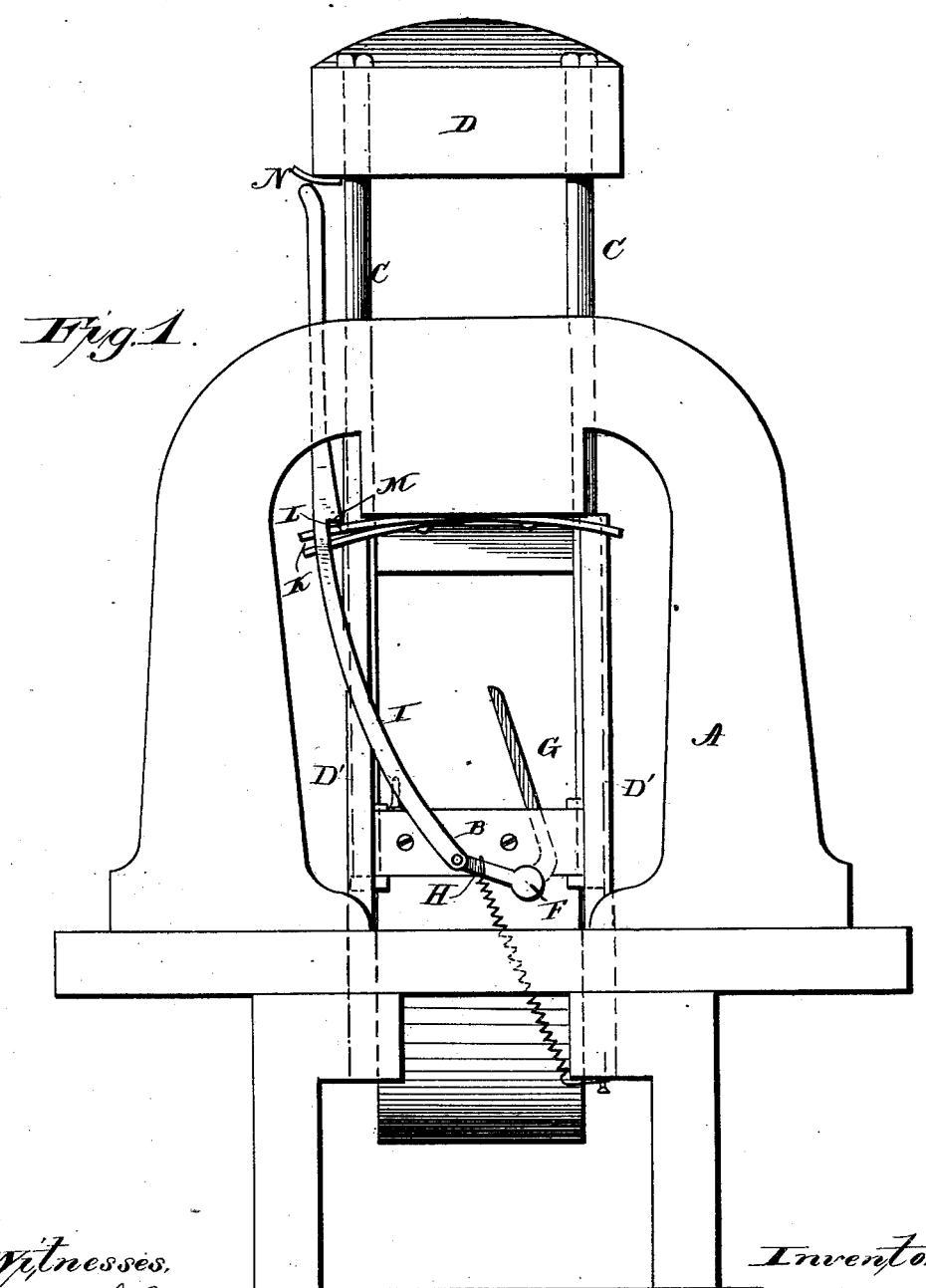

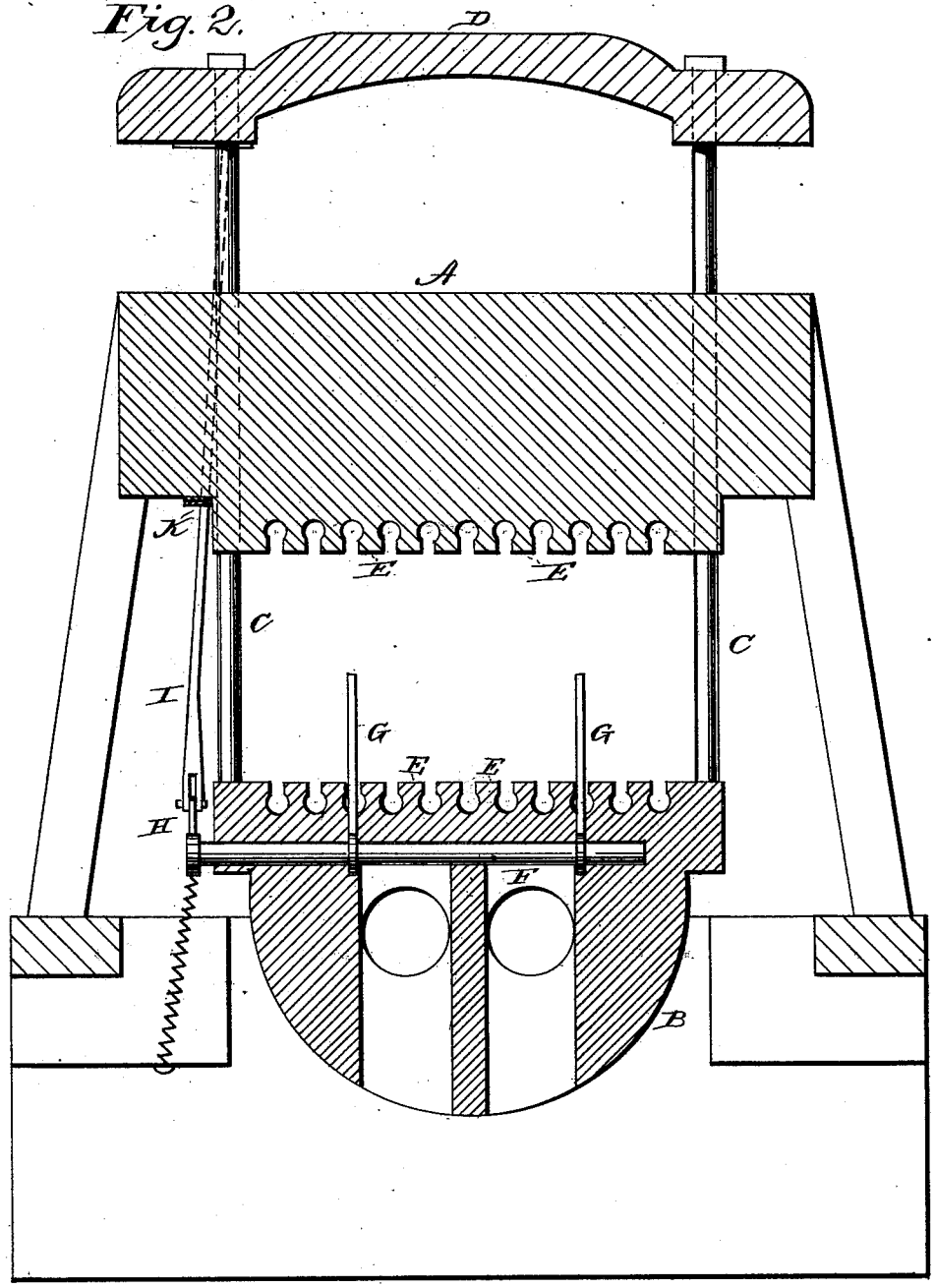

HENRY RIESEL, OF GALVESTON, TEXAS.

BALE-EJECTOR FOR PRESSES.

SPECIFICATION forming part of Letters Patent No. 235,295, dated December 7, 1880.

Application filed August 14, 1880. (Model.)

*To all whom it may concern:*

Be it known that I, HENRY RIESEL, of Galveston, in the county of Galveston, and in the State of Texas, have invented certain new and useful Improvements in Bale-Ejectors for Presses; and I do hereby declare that the following is a full, clear, and exact description thereof, reference being had to the accompanying drawings, and to the letters of reference marked thereon, making a part of this specification.

This invention relates to certain improvements in cotton-bale presses or compressors; and it has for its object to provide a means whereby the bale, after being properly compressed, will be automatically ejected from the press, as more fully hereinafter specified. These objects I accomplish by means of the apparatus illustrated in the accompanying drawings, in which—

Figure 1 represents the apparatus with the parts in position to eject the bale, and Fig. 2 a transverse sectional view of the same.

The letter A indicates the frame of the press or compressor, which may be constructed in the ordinary manner or after any approved method.

The letter B indicates a follower, which has secured to its corners the vertical rods C, which pass upward through guideways in the upper part of the frame, and are adapted to travel back and forth in the same vertically. The upper ends of the said rods connect with a suitable cross-bar, D, by means of which the follower may be connected with any operating mechanism by which it can be reciprocated. The follower is, at its corners, confined between the vertical guides D', secured to the machine, and is adapted to travel up and down therein.

The letter E indicates the usual channel-bars of the follower and head-block.

The letter F indicates a shaft extending longitudinally through the follower below the channel-bars E, and to said shaft are keyed the bent arms G, each of which lies between two of the channel-bars E. The said shaft E, at one end, extends beyond its bearing, and is provided with a crank, H, as shown. The said crank, like the arms E, is securely keyed to the shaft, so that all will move together without any possibility of either slipping.

To the end of the crank H is secured a bar, I, which extends upward through a slotted guide, K, secured to the frame at any convenient part thereof. The rear edge of the slot in said guide forms a detent, L, which is adapted to engage the hook M on the bar I, when the follower has been fully elevated and is returning on its downward stroke, so as to operate the shaft F, and by means of the shaft the arms G to discharge the bale, as more fully hereinafter explained.

The bar above the hook is gradually beveled to the free end, so as to permit the hook to be thrown over the detent as the follower is elevated.

The letter N indicates a trip secured to the cross-piece, which is attached to the rods of the follower, the office of which is to move the bar I, so as to release the hook when the follower is completing its downward movement, in order to allow the parts to assume their normal position ready for the next bale, as more fully hereinafter specified.

The operation of my improved apparatus will be readily understood in connection with the above description, and is as follows:

When the follower is down the arms G are between their respective channel-bars. Upon elevating the follower by any proper means the bar I will travel up through the guide until the hook M passes the detent L. Upon the return of the follower to release the compressed bale the hook M will engage the detent L, which will cause the shaft F to rotate, partially elevating the arms G, so as to eject the bale. When the trip N comes in contact with the upper end of the bar I it will shift the same, releasing the hook from the detent and permitting the parts to assume a normal position, with the bars G between their respective channel-bars.

Having thus described my invention, what I claim, and desire to secure by Letters Patent, is—

The combination of the follower B, secured between and adapted to travel in ways or guides D', and provided with vertical rods C, secured to a cross-piece, D, the shaft F, provided with keyed arms G, extending between the channel-bars of the follower, the crank H, secured to the said shaft, the hooked bar I, extending through a guide, K, and adapted to engage the detent L thereof, and the trip N, secured to the cross-piece D, the whole constructed to operate substantially in the manner specified.

In testimony that I claim the foregoing I have hereunto set my hand this 23d day of July, 1880.

HENRY RIESEL.

Witnesses:
H. FALKENHAGEN,
JUSTUS I. SCHOTT.